(12) United States Patent
Kurbel

(10) Patent No.: US 12,319,240 B2
(45) Date of Patent: Jun. 3, 2025

(54) MOVABLE TRANSVERSAL ROOF RACK

(71) Applicant: Matej Kurbel, Sered (SK)

(72) Inventor: Matej Kurbel, Sered (SK)

(73) Assignee: Matej Kurbel, Sered (SK)

( * ) Notice: Subject to any disclaimer, the term of this patent is extended or adjusted under 35 U.S.C. 154(b) by 232 days.

(21) Appl. No.: 18/253,396

(22) PCT Filed: Nov. 18, 2021

(86) PCT No.: PCT/SK2021/050014
§ 371 (c)(1),
(2) Date: May 18, 2023

(87) PCT Pub. No.: WO2022/108536
PCT Pub. Date: May 27, 2022

(65) Prior Publication Data
US 2024/0092273 A1      Mar. 21, 2024

(30) Foreign Application Priority Data

Nov. 18, 2020   (SK) .................................. 50064-2020

(51) Int. Cl.
*B60R 9/042*      (2006.01)

(52) U.S. Cl.
CPC ..................... *B60R 9/042* (2013.01)

(58) Field of Classification Search
CPC ......... B60R 9/042; B60R 9/045; B60R 9/055; B60R 9/08; B60P 3/1025
USPC .......................................... 224/310; 414/462
See application file for complete search history.

(56) References Cited

U.S. PATENT DOCUMENTS

| | | | | |
|---|---|---|---|---|
| 4,329,100 A | * | 5/1982 | Golze | B60R 9/042 224/310 |
| 5,535,929 A | * | 7/1996 | Neill | B60R 9/042 224/310 |
| 6,428,263 B1 | * | 8/2002 | Schellens | B60R 9/042 224/310 |
| 7,048,490 B2 | * | 5/2006 | Henderson | B60R 9/042 224/310 |
| 7,108,162 B2 | * | 9/2006 | Stadler | B60R 9/042 224/310 |

(Continued)

FOREIGN PATENT DOCUMENTS

| | | |
|---|---|---|
| DE | 8914121 U1 | 1/1990 |
| DE | 29602977 U1 | 4/1996 |
| WO | 2018152574 A1 | 8/2018 |

OTHER PUBLICATIONS

PCT International Search Report; May 27, 2022.
PCT Written Opinion; May 27, 2022.

*Primary Examiner* — Corey N Skurdal
(74) *Attorney, Agent, or Firm* — S.J. Intellectual Property LTD.

(57) ABSTRACT

A movable transversal roof rack according to the invention, enabling loading and unloading a cargo away from a vehicle roof consisting of two support elements, one support element to be placed on a front part of the vehicle roof, and another support element to be placed on a rear part of the vehicle roof, wherein each support element comprises a support, a first arm and a second arm adapted for the mutual insertion in such a way that the support element in its folded position forms the compact longitudinal body of substantially square, rectangular, or elliptical cross-section.

20 Claims, 10 Drawing Sheets

(56) References Cited

U.S. PATENT DOCUMENTS

| | | | |
|---|---|---|---|
| 10,647,262 B2 * | 5/2020 | Müller | B60R 9/042 |
| 11,110,868 B2 * | 9/2021 | Dimmen | B60R 9/042 |
| 11,225,198 B2 * | 1/2022 | Boyle | B60R 9/042 |

* cited by examiner

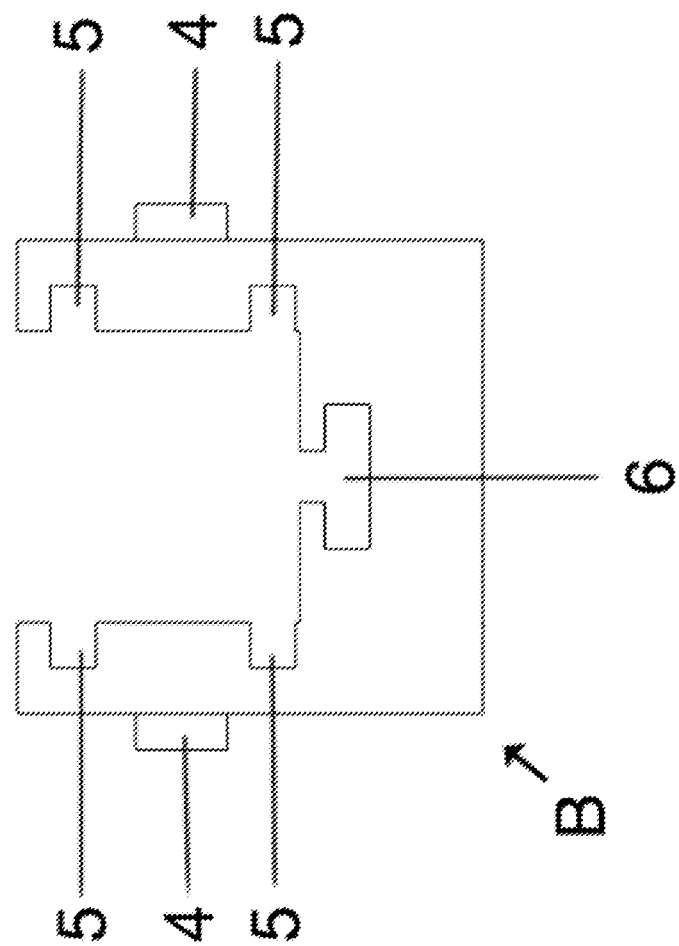

MOVABLE TRANSVERSAL ROOF RACK

TECHNICAL FIELD

The invention relates to a transversal roof rack for motor vehicles, that allows sliding of and lowering of the roof box or other device attached to this transversal roof rack.

BACKGROUND ART

The transversal roof rack is a device for fixing on a vehicle roof and thus providing possibility to attach a roof box or bicycle or ski carriers thereon. Prior Art transversal roof racks are firmly fixed on the vehicle roof and therefore loading and unloading of the roof box positioned on the rack is rather difficult. Also fixing of the bicycles is very strenuous, because the bicycle has to be positioned on the vehicle roof and only afterwards it is fixed to its carrier. It results in the risk of vehicle roof damage, scratching or falling of the bicycle. This activity is also very physically demanding particularly for smaller persons or owner of higher vehicles, such as SUV and minivans.

Published Slovak patent application PP 125-2018 describes a sliding roof rack having the joint connection of the frames, which rack consists of the fix frame with articular connections, movable frame with articular connections, a main joint, arms, and a frame for attachment of a superstructure. The fixed frame with two articular connections is connected to the arms joining each other in the main joint. Also the arms are attached to the main joint. Said arms are joined with the articular connections of the sliding rack. Outer side of the movable frame is equipped with small wheels positioned and moving in the rail, which rail forms the inner part of the frame for the attachment of the superstructure.

Disadvantage of said solution resides in the fact that although the roof box or bicycle carriers are moved away from the vehicle roof, their position in relation to the vehicle roof is not horizontal. Consequently, it is practically not usable for the roof box, because during the loading under such acute things would fall out. It is also the problem of other embodiments. EP0014185 discloses similar solution having the same disadvantage.

WO2009/110811 describes the roof rack specialized for bicycle transport on the vehicle roof. It cannot be used for the roof box, because during loading and unloading the movable rack frame is turned by 180° outside the vehicle roof.

WO 2010/064233 discloses the roof rack for mounting on the vehicle roof, which rack comprises the frame fixed to the roof, at least one rail assembly going through the vehicle and comprising the first rail segment, which is stable in relation to the frame, the second rail segment, which is movable in relation to the frame, the third rail segment, which is rotatable in relation to the second rail segment around the axis perpendicular to the sliding axis of the rail, and the fourth rail segment, which is sliding in relation to the third rail segment. At least fourth rail segment contains load supports. The rack can be configured between the storage position, in which the segments are telescopically inserted into the frame, and its unfolded position, in which the third and fourth rail segments are extended downwards. Disadvantage of said solution resides in the fact that the load fixed on the support in unfolded position is turned by 90° during its moving to the vehicle roof, which is not acceptable for the roof box.

SUMMARY OF THE INVENTION

The aim of this invention is to create a movable roof rack lacking the above-mentioned deficiencies and ensuring easy loading and unloading of the load on the rack including loading and unloading of the roof box and ski and bicycle carriers, as well as easy loading and unloading of baggage to and from the roof box fixed on the rack without rotating of the roof box during sliding the roof rack outward or inwards.

The movable transversal roof rack according to this invention ("Nomad 1") enabling loading and unloading a cargo away from a vehicle roof consisting of two support elements; one support element to be placed on a front part of the vehicle roof, and another support element to be placed on a rear part of the vehicle roof. Each support element comprises a support, a first arm and a second arm wherein:
  the support is in the form of a longitudinal profile containing:
    means for attachment of holders for fixing of the support element on the vehicle roof, and
    guiding means of the support arranged along the support, where the guiding means of the support are equipped with
      stoppers of the support for preventing complete sliding of the first arm from the support;
  the first arm is arranged slidingly movable along the support, where the first arm consists of a first element and a second element mutually interconnected via a joint, wherein sum of lengths of the first element and second element represents the length of the first arm, and wherein the second element is adapted for deflection from its horizontal position around the joint downwards by an angle of 1° to 90° to a tilted position, and wherein the first arm further comprises:
    at least one longitudinal side wall,
    first guiding means of the first arm adapted for cooperation with the guiding means of the support arranged along at least a part of the first element, and
    second guiding means of the first arm in the form of at least two grooves arranged substantially parallelly along the first element and the second element on at least one longitudinal side wall, and wherein in the tilted position of the second element, the second guiding means of the first arm are in a form of two broken grooves, and wherein the second guiding means of the first arm are equipped with
      stoppers of the first arm for preventing complete sliding of the second arm from the first arm;
  the second arm is arranged slidingly movable along the first arm, wherein the second arm comprises:
    load securing means; and
    guiding means of the second arm in a form of two projections adapted for movement in the broken grooves of the first arm and for stabilization of the second arm in its horizontal position.

The guiding means of second arm in the form of two projections can be e.g. in the form of pins having hexagonal or cylindrical shape or they can be in the form of small axle with small wheels or bearing for facilitating of the projections movement in the broken grooves of the first arm. Two projections are arranged on the second arm offset from each other (not in one vertical, one under the other with respect to the horizontal position of the second arm) to ensure their jamming in the broken grooves of the first arm in the tilted position of the second element for stabilization the second arm in the horizontal position.

Support can have any suitable cross-section, for example circular, elliptical, square, triangular, rectangular, hexagonal, or octagonal shapes. The cross-section of support can have the cross-section of "U" shape, inverted "U" shape, "T" shape, or inverted "T" shape. Also, it can have hollow or full profile.

The cross-sections of the support, first arm, and second arm are such, that the support, first arm, and second arm are adapted for mutual insertion into each other such a way, that the support element in a folded position, forms a compact longitudinal body of substantially square, rectangular, or elliptical cross-section.

The support guiding means can be in the form of one protrusive rail or groove equipped with the stoppers at their ends. In preferred embodiment the guiding means can be in the form of two and more parallel rails or grooves. The first guiding means of first arm are made to be complementary with the guiding means of support; either in the form of a groove, or in the form of a rail or pin.

According to the first preferred embodiment the support has a square or rectangular cross-section, and the guiding means of support are in the form of two protruding rails or grooves arranged one on each longitudinal side wall of the support on its outer side.

The first arm can have the cross-section of an inverted stylized letter "U" and the first guiding means of the first arm are arranged on at least one arm of the inverted letter "U" on its inner side. And the second guiding means of the first arm are arranged on at least one arm of the inverted letter "U" on its outer side.

According to another embodiment the first arm comprises two first guiding means of the first arm arranged, one at each arm of the inverted letter "U" and two second guiding means of the first arm arranged, one at each arm of the inverted letter "U".

The second arm can have the cross-section of the inverted stylized letter "U" and the guiding means of second arm can be arranged on at least one arm of the inverted letter "U" at its inner side. According to a preferred embodiment the guiding means of the second arm can be arranged, one at each arm of the inverted stylized letter "U" at its inner side.

At its proximal end the second arm is equipped with a cutout at its upper part, surrounding the second element of the first arm in its tilted position for enabling the movement of the second arm on the first arm in the tilted position.

According to another preferred embodiment the second arm can be equipped with an anchoring element. The anchoring element can have an anchor-like shape or the shape of a small leg having one or more substantially rectangular projections. The purpose of the anchoring element is to increase the load bearing capacity of the roof rack.

If the second arm has the cross-section of the inverted stylized letter "U", the anchoring element can be arranged at the upper part of the second arm at its inner side. In this case the first arm comprises a complementary longitudinal groove arranged at the outer side of its upper wall, which groove enables the movement of the anchoring element in the longitudinal groove.

According to a preferred embodiment the second arm can be equipped with at least one stabilization element (preferably with two) arranged at the proximal end of the second arm (at the end by which the second arm is connected to the first arm). The stabilization element can be e.g. in the form of a projection. The stabilization element, comprises a region R (e.g. a surface or an edge), wherein the stabilization element is arranged on the second arm in such a way, that when the guiding means of second arm move through the groovers' brakes of the first arm, the stabilization element is leaning, via the region R, against the first arm or the first element of the first arm from below and thus increasing the stability of the second arm in the horizontal position.

If the second arm has the shape of the inverted letter "U", the stabilization element can be in the form of two horizontal projections formed at the proximal end of the second arm, at the end of the arms of the inverted letter "U" in inward direction.

According to the second preferred embodiment the support has the cross-section of the stylized letter "U", and the guiding means of support are in the form of two protruding rails or recessed grooves arranged, one on each longitudinal side wall of the support at its inner side.

According to the same embodiment the first arm has the cross-section of the inverted stylized letter "U" insertable into the support. The first guiding means of first arm are arranged on at least one arm of the letter "U" at its outer side; and the second guiding means of the first arm are arranged on at least one arm of the letter "U" at its inner side.

Preferably, according to the same embodiment, the first arm can comprise two first guiding means of first arm arranged, one at each arm of the letter "U", and two second guiding means of first arm arranged, one at each arm of the letter "U".

According to the same embodiment, the second arm can have square, rectangular or a stylized letter "T" cross-section and the guiding means of second arm are arranged on at least one longitudinal side wall of the second arm on its outer side. The second arm can comprise two guiding means of second arm arranged, one on each longitudinal side wall from the outer side.

Preferably, the second arm is equipped with the anchoring element from the bottom, and the first arm comprises the complementary longitudinal groove arranged at its bottom wall from the inner side.

According to the second embodiment the second arm can be fully or at least partially, equipped with a cover for complete or at least partial covering of the support and the first arm in the folded position of the support element. For example, the cross-section of the second arm with the cover can have a shape of stylized letter "M".

According to this embodiment the stabilization element can be arranged at the proximal end of the cover (the same end as the proximal end of the second arm). The stabilization element can be e.g. in the form of a projection.

The stabilization element, comprises a region R (e.g. a surface or an edge), wherein the stabilization element is arranged on the cover in such a way, that when the guiding means of second arm move through the groovers' brakes of the first arm, the stabilization element is leaning, via the region R, against the first arm or the first element of the first arm from below. It also increases stability of the second arm in its horizontal position.

If the second arm with the cover has the shape of the stylized letter "M", the stabilization element can preferably be in the form of two horizontal projections formed at the proximal end of the cover, at the bottom end of the letter "M" legs in inward direction.

Load securing means can be any of currently used load securing means. For example, the load securing means can be in the form of a raised or recessed rail arranged on the upper wall of the second arm from its outer side, or in another form suitable for securing special carriers for bicycles, skis or the roof box.

Mutual sliding in/sliding out of the first and the second arm from the support is ensured via standard types of transmissions, such as ridge, belt, friction, chain, gearing, screw transmissions.

The arm movement can be driven mechanically or electrically. The electric drive can be provided by an electric engine, control unit and battery as the energy source; preferably housed in the second arm. In the embodiment with the engine, it is possible to control the decrease level of second arm electronically.

The support, the first arm, and the second arm are preferably substantially of the same length and are arranged in mutually sliding positions.

The support, the first arm and the second arm can be individually equipped with one opening from the side, wherein the individual openings are positioned in such a way that they are arranged in one line in the folded position of the support element. It is possible to insert a mechanic safety lock into these openings, which safety lock passes through the support as well as both arms and thus secures the support element in the folded position.

The support can have a rectangular or a square cross-section. It can be made from the hollow or full profile having length "l". The first arm can have the cross-section of the inverted letter "U" shape, wherein the first arm has the same length "l", and surrounds the support from above, while the first arm and the support are in mutual sliding connection, and secured against sliding out by the stoppers on the support. The outer width of the first arm is a little smaller than inner width of the second arm, which second arm can also have the shape of the inverted letter "U". The first arm and second arm are in mutually sliding connection, and secured against sliding out by the stoppers on the first arm. In their folded position, the support and the first arm are inserted in the second arm, which second arm is equipped with means for the attachment of the special carriers or roof box or another load on its upper surface. The second arm is always kept in its horizontal position.

According to the second embodiment, the support has the cross-section of the letter "U" with length "l"; the first arm also has the cross-section of the letter "U" with length "l", however the first are is of a smaller width than the support. The outer width of the first arm is a little smaller than the inner width of the support. The support and the first arm are in mutual sliding connection, and secured against sliding out by the stoppers. The second arm can have prism shape with the cross-section insertable into the first arm. Alternatively, the second arm can have the cross-section of letter "T", wherein the upper part of the letter "T" overlaps the upper parts of the support and the first arm of letter "U" shape. To make the overlap ideal, as well as from the aesthetic point of view, it is possible to extend the upper arms of the letter "T" of the second arm and bend them downwards, and cover the support along the whole length and possibly also along the whole height. In that case the cross-section of the second arm resembles the stylized letter "M". In their folded position the support and the first arm can be covered by the second arm, which second arm is equipped with means for connecting of the special carriers or roof box or another load on its upper surface.

The advantage of the invention resides also in the fact that the second arm, and consequently also the roof box, are kept in the horizontal position during the entire unfolding of the roof rack and also in its end positions (the folded and unfolded positions of the moving elements) and thus, the movement of the luggage in the box is avoided.

BRIEF DESCRIPTION OF THE DRAWINGS

FIG. 7a shows the cross-section of the first element of the first arm of the support element according to FIG. 5.

DETAILED DESCRIPTION

Example 1

Figure 1:
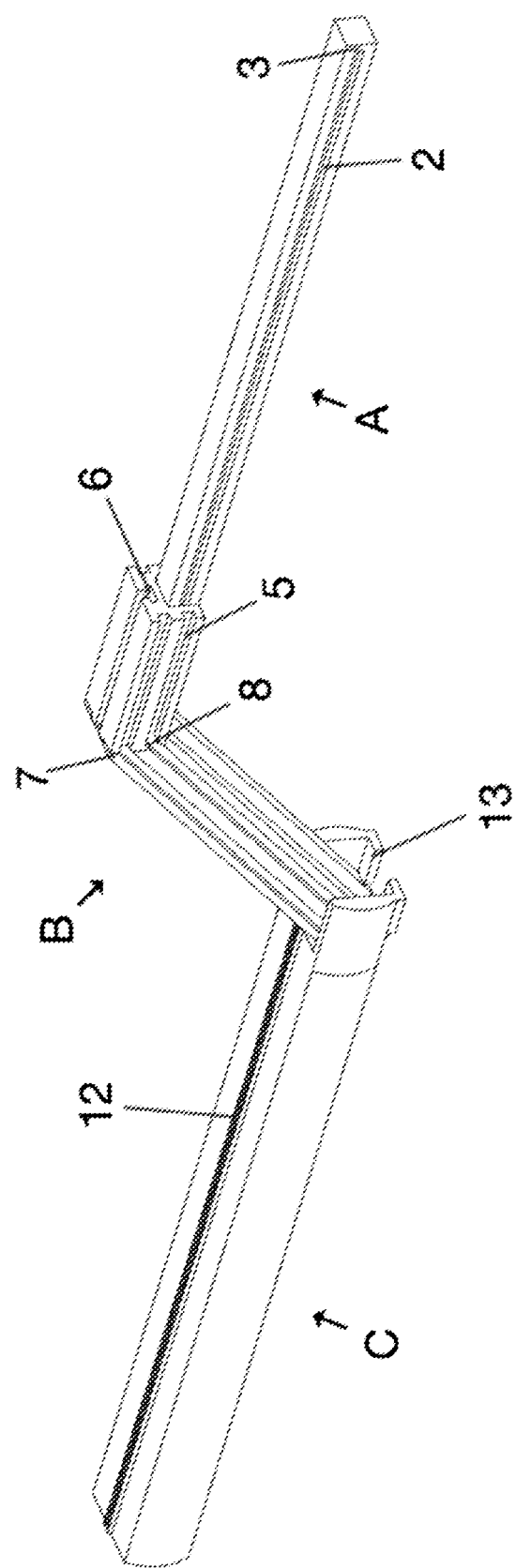
FIG. 1 shows one support element of the movable transversal roof rack according to the first embodiment of the invention in the unfolded (loading, unloading) position.
Figure 2:
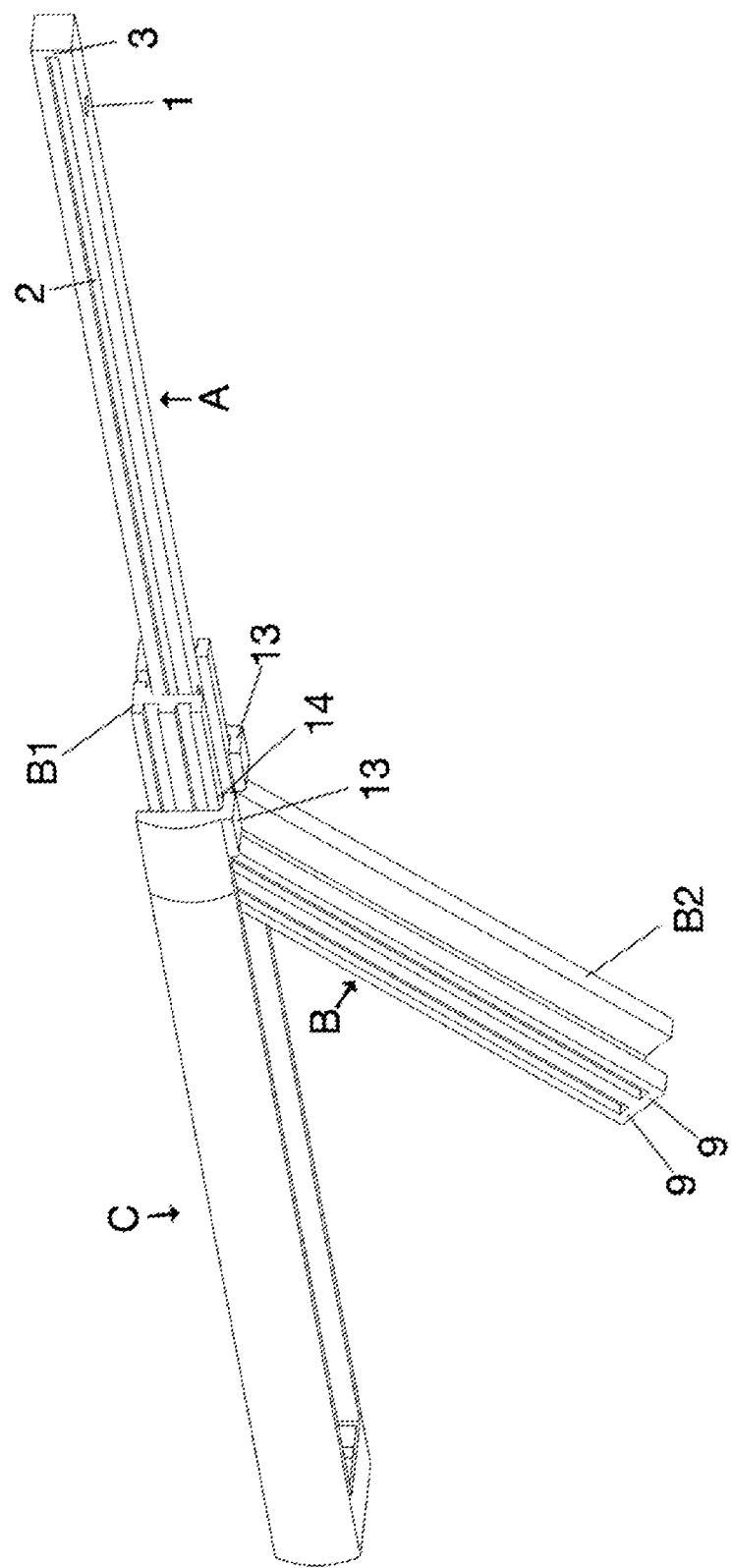
FIG. 2 shows the same support element during opening to the unfolded position.

The movable transversal roof rack according to the first embodiment as illustrated in FIG. 1 comprises: the support A, first arm B, and second arm C.

Support A can be fixed to the vehicle roof by fixing holders. For this purpose, two symmetrical openings—means 1 for attachment of the holders, are formed at the bottom part of support A. The openings are universal. The holders for fixing to the vehicle roof are different depending on the vehicle type, and are not covered by the present invention. The length of the support A is approximately the same as the width of the vehicle roof, and its cross-section is square or rectangular. Its longitudinal side walls are equipped with guiding means 2—a rail. This rail can be external, extending over the surface of the side wall of the support A, or it can be internal in the form of a groove. These guiding elements 2 of the support A serve as the guiding rails for the first guiding means 4 of the first arm. Both ends of the guiding means 2 of the support are equipped with the stoppers 3 to prevent the first arm B from sliding out.

Figure 3A:
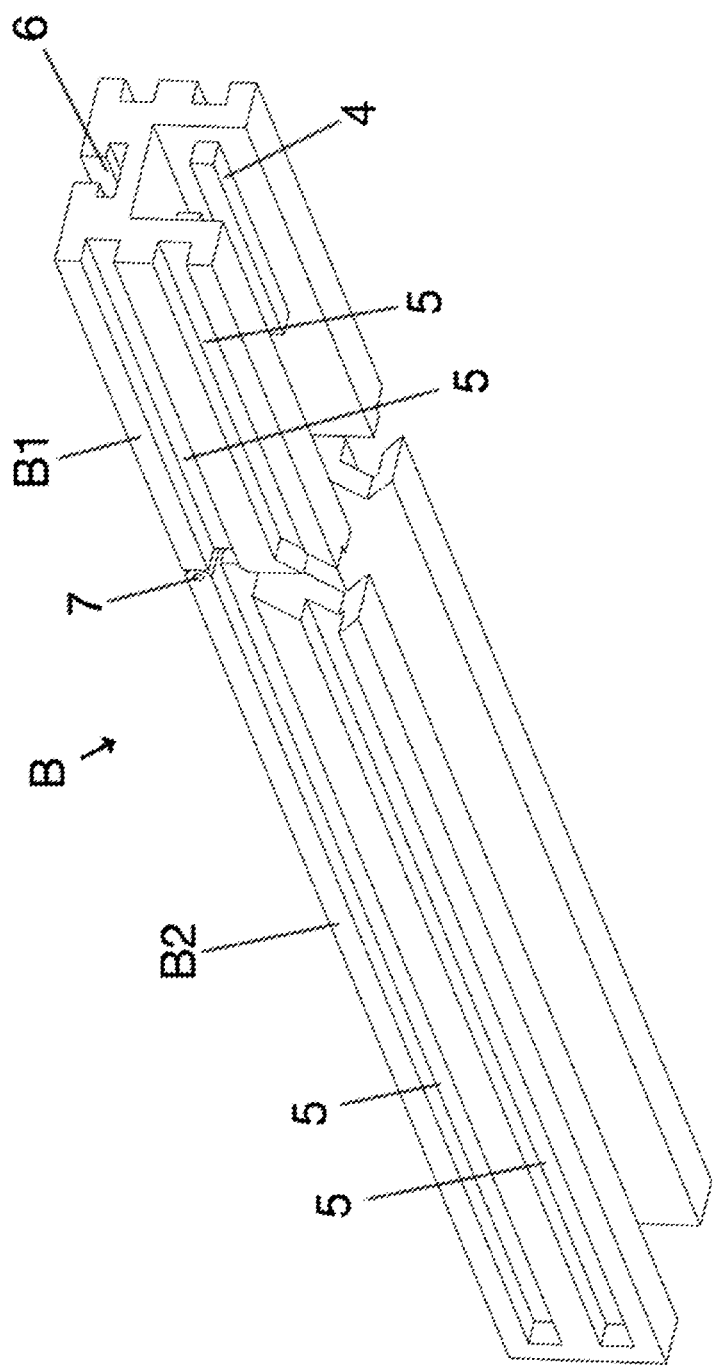
FIG. 3a shows the first arm of the support element according to the FIG. 1 or 2 in the horizontal position—slid onto the support (the support not shown).
Figure 3B:
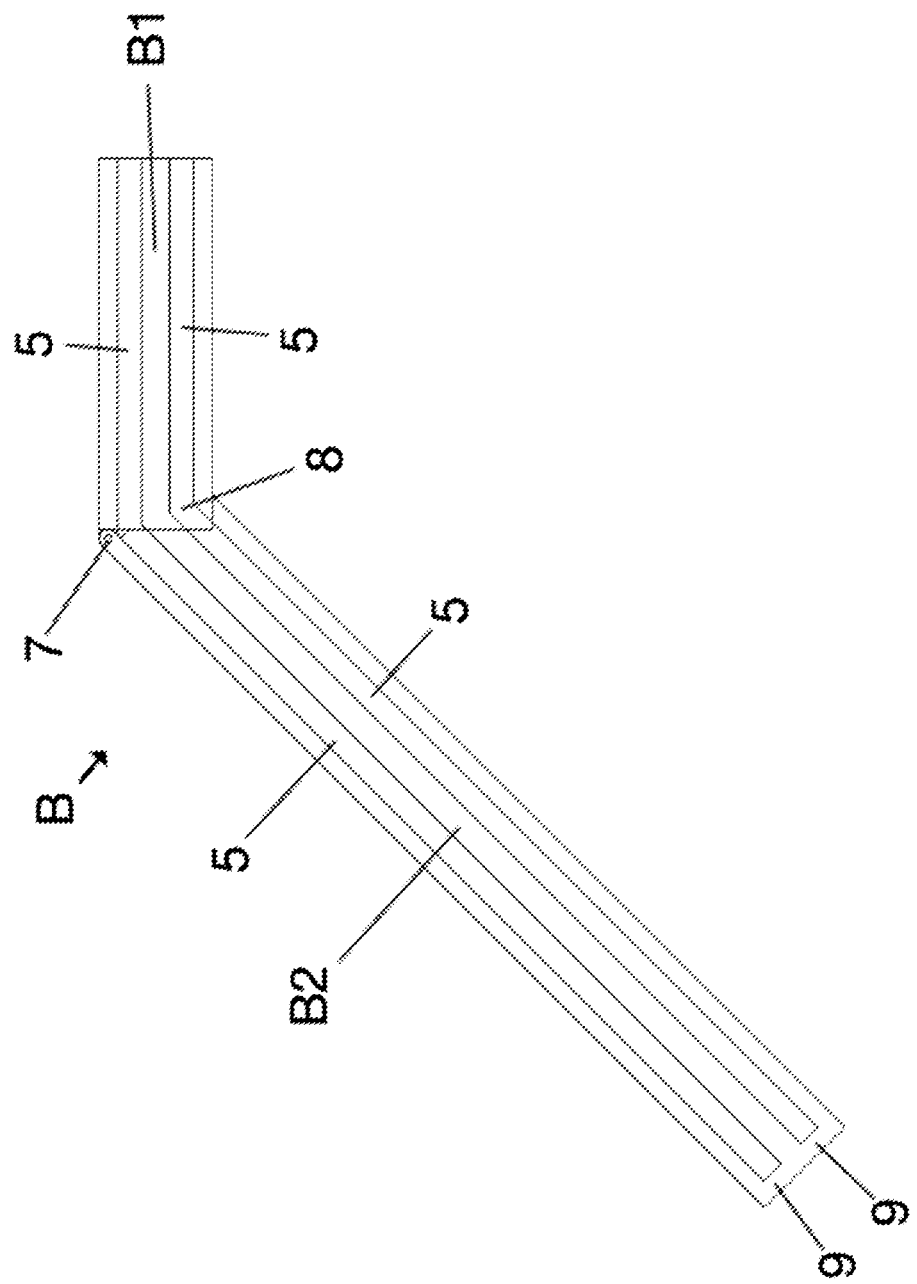
FIG. 3b shows the side view of first arm of the support element according to FIG. 1 or 2 in its tilted position.
Figure 3C:
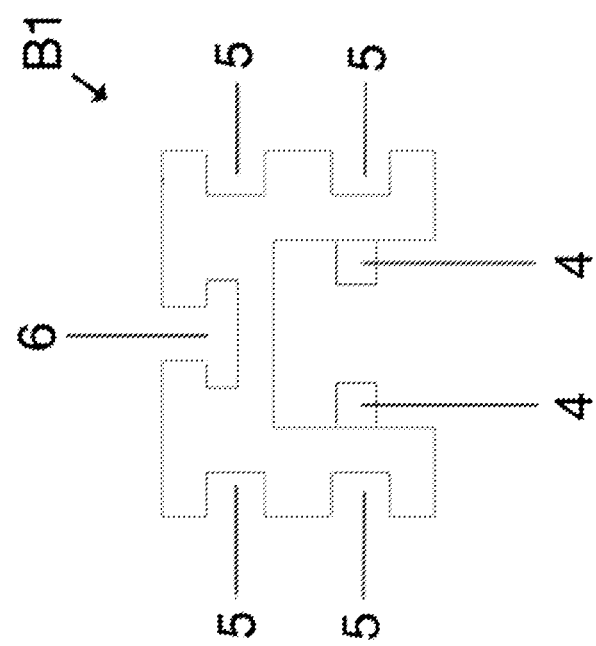
FIG. 3c shows the cross-section of the first element of the first arm of the support element according to FIG. 1 or 2.

The first arm shown on FIGS. 3a and 3b consists of the first element B1 and the second element B2, connected via a hinge 7 (joint). This hinge 7 facilitates decrease of the second element B2 downwards. The cross-section of the first element B1 and second element B2, as shown on FIG. 3c, has the shape of the inverted angular letter "U", which is along its length from its outer side, at two opposite sides equipped with the second guiding means 5 in the form of two grooves at each side. The upper parts of the first element B1 and the second element B2 are equipped with the longitudinal groove 6 for cooperation with the anchoring element 11 of the second arm. The first element B1 is equipped, along at least a part of its length, with the first guiding means 4 in the form of the rail for the cooperation with the guiding means 2 of the support. The inner width of the first element B1 and the second element B2 substantially corresponds with the outer width of the support A, in such a way that the support A can be inserted into the first arm B. The second element B2 is beveled at its proximal end towards the first element B1, and thus forms a break 8 in the area of the joint 7, and therefore the second guiding means 5 are in the form of two broken grooves. This bevel determines a decrease angel of the second element B2, and helps to avoid the upward movement of the second element B2 during extension of the second arm C. Length of the second element B2 determines the decrease depth, but sum of the first element B1 and the second element B2 lengths cannot be bigger than the length of the support A bor the length of the second arm C. The second guiding means 5 of the second element B2 of the first arm are equipped with the stoppers 9 at their distant ends, in order to prevent sliding out of the second arm C.

Figure 4:
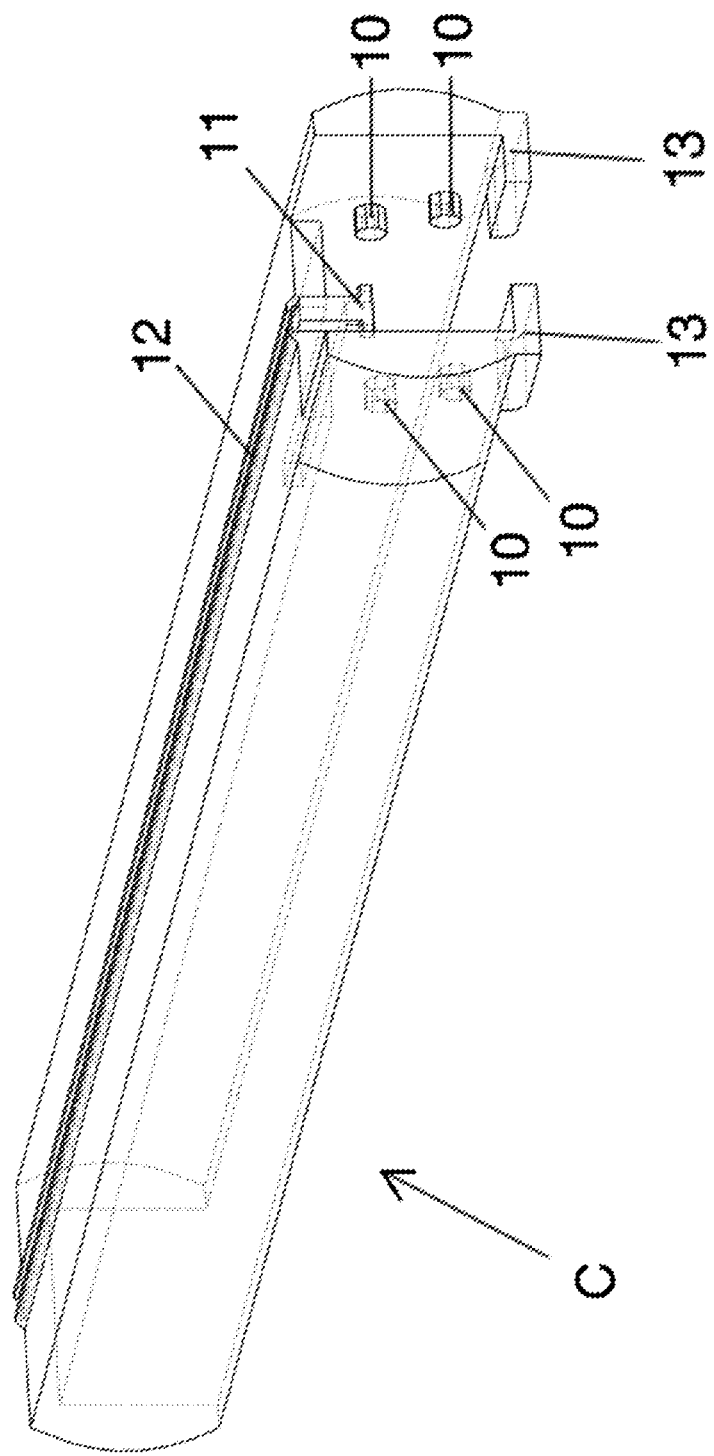
FIG. 4 shows detailed view of the second arm of the support element illustrated on FIG. 1 or 2.

In its folded position, the second arm C, as shown on FIG. 4, is arranged slidingly movable on the first arm B (not shown here). The cross-section of the second arm C has the shape of the inverted letter "U" having the load securing means 12 or special holders for securing a load, such as bicycle or ski carriers or roof box, on its upper surface. The load securing means 12 can be in the form of a groove, one or more rails, openings with screws, and the like. The inner side of the second arm C is equipped with the guiding means 10 of second arm in the form of a pair of projections on each arm of the inverted letter "U". These projections in the form of pins are adapted for the movement in the broken grooves of the first arm B, and for stabilization of the second arm C in its horizontal position. Due to the above-mentioned reasons the projections are not arranged vertically, in order to ensure their jamming in the groves (of the second guiding means 5) of the first arm during deflection, and thus keeping the second arm C in the horizontal position. The bottom part of the proximal end of the second arm C is equipped with the stabilization elements 13, in order to avoid decrease of the second arm C from its horizontal position during movement of the guiding means 10 of second arm through the break 8 of the first arm. The upper part of the proximal end of the second arm C is equipped with the cutout surrounding the second element B2 of the first arm in the tilted position for enabling the movement of the second arm C on the first element B1 of the first arm. The second arm comprises, in its upper part from its inner side, the anchor 11 for cooperation with the longitudinal groove 6 of the first arm. Said anchor 11 increases the load bearing capacity of the second arm C.

Example 2

The movable transversal roof rack according to the second embodiment, as shown on FIGS. 5, 6, 7a, and 7b, comprises the same as in the Example 1 the support A, first arm B, and second arm C.

The support A comprises the means 1 for attachment of holders to the vehicle roof. For this purpose, two symmetrical openings for screwing of the holders are formed at the bottom part of the support A. The openings are universal. The holders for fixing to the vehicle roof are different depending on the vehicle type and are not covered by the present invention. The length of the support A is approximately the same as the width of the vehicle roof, and its cross-section has shape of angular letter "U". Its longitudinal side walls are from their inner side equipped with guiding means 2—the rail. This rail can be external, extending over the surface of the inner side wall of the support, or it can be in the form of a groove. These guiding means 2 of the support serve as the guiding rails for the first guiding means 4 of the first arm. Both ends of the guiding means 2 of the support are equipped with the stoppers to prevent the first element B1 of the first arm from sliding out. According to another embodiment, the first arm B, as shown in cross-section on FIG. 7a, consists of the first element B1 and the second element B2, connected via a joint 7 (hinge) same as in the Example 1. This joint facilitates decrease of the second element B2 downwards. The first arm B according to the second embodiment differs only in the shape of the cross-section. It has the shape of the angular letter "U". Thus, the cross-section of the first element B1 and the second element B2 has the shape of the angular letter "U", which is along its length from its inner side, at two opposite sides, equipped with the second guiding means 5 in the form of two grooves at each side. The bottom parts of the first element B1 and the second element B2 are equipped with the longitudinal groove 6 for cooperation with the anchoring element 11 of the second arm. At least part of the length of the first element B1 is, on its outer side, equipped with the first guiding means 4 in the form of protruding rail for cooperation with the guiding means 2 of the support. The outer width of the first element B1 and the second element B2 substantially corresponds with the inner width of the support A, in such a way that the first arm B can be inserted into the support A. The second element B2 is beveled at its proximal end towards the first element B1, and thus forms a break 8 in the area of the joint 7, and the second guiding means 5 are therefore in the form of two broken grooves. This bevel determines a decrease angel of the second element B2, and helps to avoid the upward movement of the second element B2 during extension of the second arm C. Length of the second element B2 determines the decrease depth, but sum of lengths of the first element B1 and the second element B2 cannot be higher than the length of the support A or the length of the second arm C. The second guiding means 5 of the second element B2 of the first arm are equipped with the stoppers 9 at their distal ends, in order to prevent the second arm C from sliding out.

The support A, as well as the first arm B and the second arm C are equipped with the openings 16 for insertion of the safety lock, when the support element is in its folded position.

Figure 6:
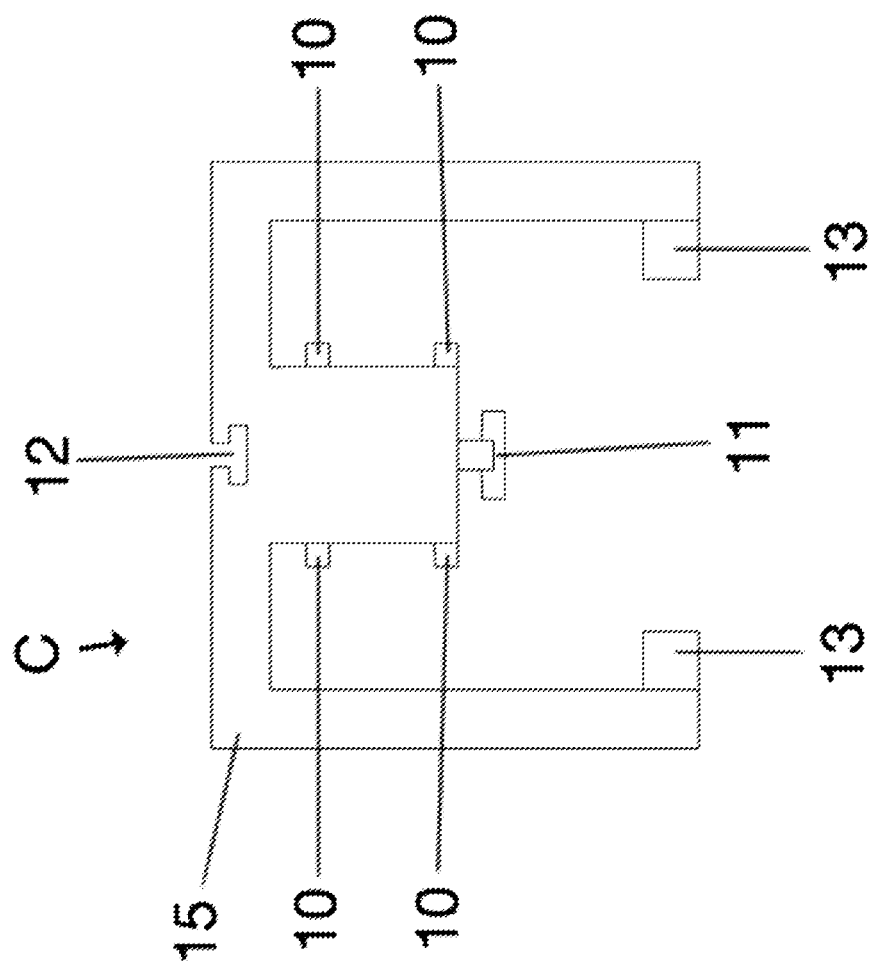
FIG. 6 shows the proximal end of the second arm with the cover of the support element shown on FIG. 5.
Figure 7B:
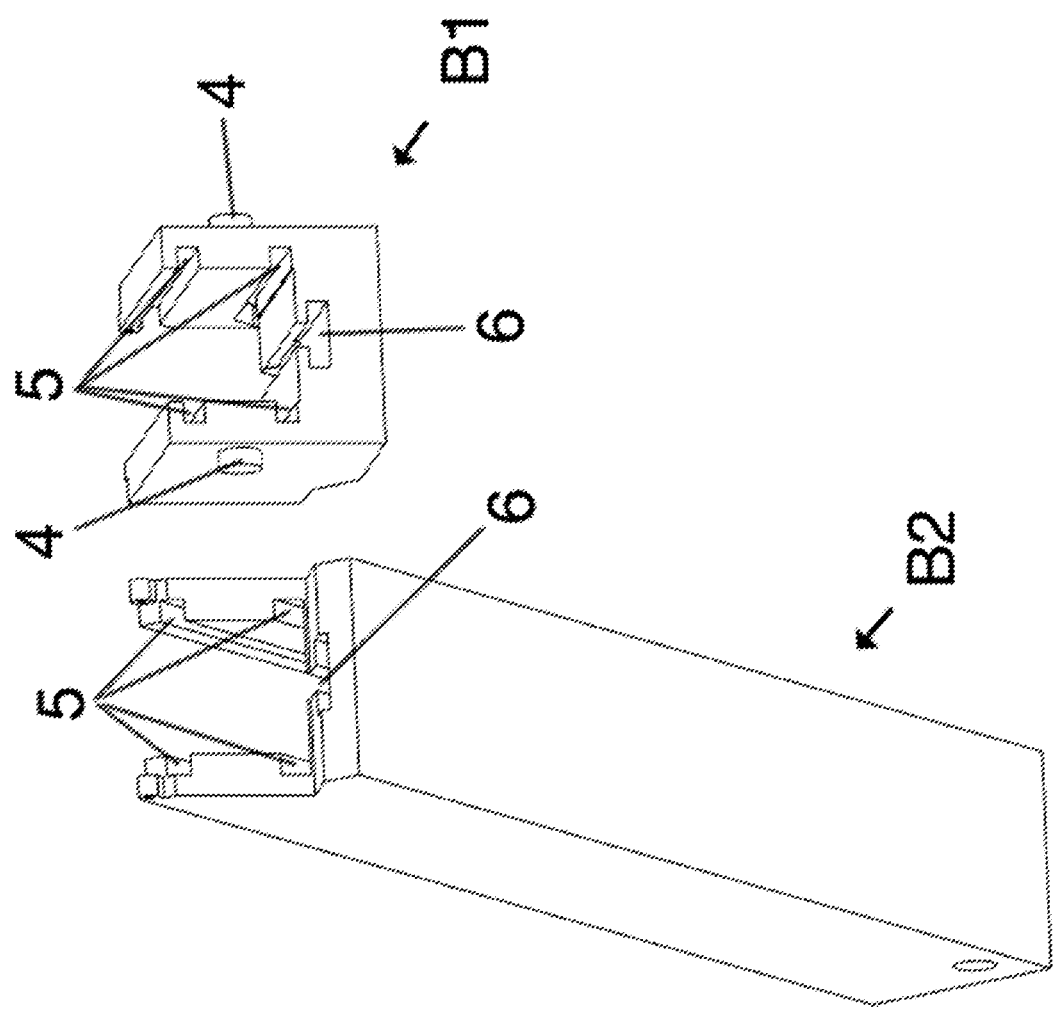
FIG. 7b shows the first element and the second element of the first arm of the support element according to FIG. 5.

According to the second embodiment of the invention, in its folded position, the second arm C, which cross-section is shown on FIG. 6, is arranged slidingly movable in the first arm B (not shown here). The cross-section of the second arm C has the shape of the stylized letter "M" having the load securing means 12, or special holders for load securing, such as bicycle or ski carriers, or roof box, on its upper surface. The load securing means 12 can be in the form of a groove, one or more rails, openings with screws, and the like. The middle short small leg of the letter "M" in the cross-section of the second arm C is in the form of a prism attached form the inner side on the ceiling of the second arm C. This prism is equipped with the guiding means 10 of the second arm in the form of two pins arranged on the opposite longitudinal sides of the prism at its proximal end to the first arm B. These pins are adapted for movement in the broken grooves of the first arm B, and for stabilization of the second arm C in its horizontal position. Due the above reasons the projections are not arranged vertically above each other, in order to ensure their jamming in the groves—of the second guiding means 5—of the first arm during tilting of the first arm B, and thus keeping the second arm C in the horizontal position. The bottom part of the middle short small leg of the letter "M" in the cross-section of the second arm C is equipped with the anchor for the cooperation with the longitudinal groove 6 of the first arm along its whole length. This anchor 11 increases the load bearing capacity of the second arm C. The second arm C is, on its proximal end at the bottom part of the legs of the stylized letter "M", equipped with the stabilization elements 13, in order to avoid decrease of the second arm from its horizontal position during movement of the guiding means 10 of second arm throughout the break 8 of the first arm.

Example 3

For facilitation of the extension and the insertion of the first arm B and the second arm C, into the rear part of the second arm C can be inserted an engine, a battery as an energy source, a control unit, a belt, a cogwheel which can be attached to the anchor 11. In such case the engine turns the belt around, the belt turns the cogwheel localized on the anchor 11 of the second arm. At the same time, in the longitudinal groove 6 of the first element B1 and the second element B2, a steel comb is arranged, over which the cogwheel moves up and down.

Example 4

Figure 5:
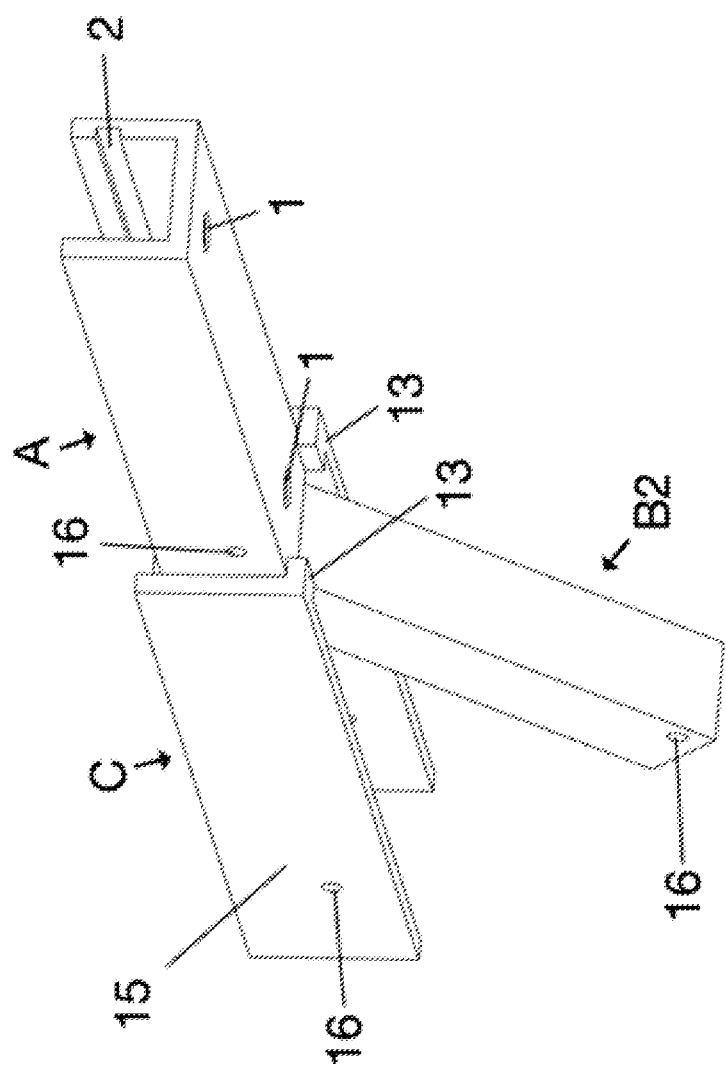
FIG. 5 shows one support element of the movable transversal roof rack according to the second embodiment of the invention.

The movable transversal roof rack, according to this invention, enabling loading and unloading of the load out of the vehicle roof, consists of two identical support elements, which elements are to be placed on the vehicle roof, one in the front part, and one in the rear part, using the holders, which are to be fixed to the support A. The holders are not covered by the subject matter of this invention, and the method of fixing thereof depends on the vehicle type. The movable transversal roof rack works as follows:

The second arms C of both support elements are pulled out manually or via electric drive, perpendicularly in relation to the vehicle length. Together with the second arm C, the first arm B is also extending via the guiding means 2 of the support A. The guiding means 10 of second arm in the form of two pairs of projections (pins) are moved in the second guiding means 5 of first arm in the form two pairs of grooves. When the joint 7 of the first arm connecting the first element B1 with the second element B2 gets out of the support A, the second element B2 descends down as shown in FIG. 5. Afterwards, the guiding means 10 of second arm, formed by two pins on both sides of the second arm, pass through the break 8, the second arm continues in its moving further diagonally downwards, in the second guiding means of the second element B2 of the first arm, until the stopper 9 at the distant end of the second element B2. Smooth transition of the guiding elements 10 of second arm is secured by the stabilization elements 13. The second arm C remains in its horizontal position. Unfolded position of the support element is shown on FIG. 1.

LIST OF THE REFERENCE SIGNS

1—means for attachment of holders
2—guiding means of the support
3—stopper of the support
4—first guiding means of the first arm
5—second guiding means of the first arm
6—longitudinal groove
7—joint
8—break
9—stopper of the first arm
10—guiding means of the second arm
11—anchoring element
12—load securing means
13—stabilization element
14—region R
15—cover of the second arm
16—opening for insertion of the safeguard
A—support
B—first arm
B1—first element of the first arm
B2—second element of the first arm
C—second arm

The invention claimed is:

1. A movable transversal roof rack enabling loading and unloading a cargo away from a vehicle roof consisting of two support elements, one support element of the support elements to be placed on a front part of the vehicle roof, and another support element of the support elements to be placed on a rear part of the vehicle roof, characterized in that each support element of the support elements comprises a support, a first arm and a second arm, wherein:
the support is in a form of a longitudinal profile containing:
means for attachment of holders for fixing the support element on the vehicle roof, and
guiding means of the support arranged along the support, where the guiding means of the support are equipped with
stoppers of the support for preventing complete sliding of the first arm from the support;
the first arm is arranged slidingly movable along the support, where the first arm consists of a first element and a second element mutually interconnected via a joint, wherein a sum of lengths of the first element and the second element represents a length of the first arm, and wherein the second element is adapted for deflection from its horizontal position around the joint downwards by an angle of 1° to 90° to a tilted position, and wherein the first arm further comprises:
at least one longitudinal side wall,
first guiding means of the first arm adapted for cooperation with the guiding means of the support arranged along at least a part of the first element, and
second guiding means of the first arm in a form of at least two grooves arranged substantially parallelly along the first element and the second element on the at least one longitudinal side wall, and wherein in the tilted position of the second element, the second guiding means of the first arm are in a form of two broken grooves, and wherein the second guiding means of the first arm are equipped with:
stoppers of the first arm for preventing complete sliding of the second arm from the first arm;
the second arm is arranged slidingly movable along the first arm, wherein the second arm comprises:
load securing means; and
guiding means of the second arm in a form of two projections adapted for movement in the broken grooves of the first arm and for stabilization of the second arm in its horizontal position.

2. The roof rack according to claim 1, characterized in that cross-sections of the support, the first arm, and the second arm are adapted for mutual insertion into each other in such a way that the support element, in its folded position, forms a compact longitudinal body of substantially rectangular cross-section.

3. The roof rack according to claim 1, characterized in that the support has a rectangular cross-section, and the guiding means of the support are in a form of two protruding rails, equipped with the stoppers at its ends, wherein the rails are arranged one on each longitudinal side wall of the support at its outer side.

4. The roof rack according to claim 1, characterized in that the first arm has a cross-section of an inverted stylized letter "U" and comprises two first guiding means of the first arm arranged one at each arm of the inverted letter "U" on its inner side, and two second guiding means of the first arm arranged one at each arm of the inverted letter "U" on its outer side.

5. The roof rack according to claim 1, characterized in that the second arm has a cross-section of an inverted stylized letter "U", and the guiding means of the second arm are arranged one at each arm of the inverted stylized letter "U", on its inner side.

6. The roof rack according to claim 5, characterized in that the second arm is equipped with an anchoring element arranged on its upper wall from the inner side, and the first arm comprises a complementary longitudinal groove arranged on its upper wall from the outer side.

7. The roof rack according to claim 1, characterized in that the second arm is equipped with at least one stabilization element arranged on a proximal end of the second arm the stabilization element comprising a region adapted to abut on the first arm for ensuring stability of the second arm in the horizontal position during transition of the guiding means of the second arm along breaks of the grooves.

8. The roof rack according to claim 1, characterized in that the support has a cross-section of stylized letter "U", and the guiding means of the support are in a form of two protruding rails arranged one on each longitudinal side wall of the support at its inner side.

9. The roof rack according to claim 8, characterized in that the first arm has a cross-section of the stylized letter "U" and comprises two first guiding elements of the first arm arranged one at each arm of the letter "U" at its outer side, and two second guiding means of the first arm arranged one at each arm of the letter "U" at its inner side.

10. The roof rack according to claim 8, characterized in that the second arm has a rectangle cross-section and it comprises two guiding means of the second arm, arranged one at each longitudinal side wall of the second arm, on its outer side.

11. The roof rack according to claim 8, characterized in that the second arm has a cross-section of stylized letter "T" and comprises two guiding means of the second arm, arranged one at each longitudinal side wall of the second arm, on its outer side.

12. The roof rack according to claim 11, characterized in that the second arm is equipped with the anchoring element, arranged from the bottom, and the first arm comprises a complementary longitudinal groove arranged on its bottom wall from an inner side.

13. The roof rack according to claim 8, characterized in that the second arm is, at least partially, equipped with a cover for at least partial overlaying of the support, and at least one stabilization element arranged on a proximal end of the cover, wherein the stabilization element comprises the region R adapted to abut on the first element of the first arm from its bottom side for ensuring the stability of the second arm in the horizontal position during transition of the guiding means of the second arm along breaks of the grooves.

14. The roof rack according to claim 1, characterized in that the load securing means are in the form of protruding or recessed rail arranged on an upper wall of the second arm from its outer side.

15. The roof rack according to any of preceding claim 1, characterized in that the support element is equipped with the gearing, ensuring sliding of the first arm and the second arm out of and onto the support and with an electric, or mechanic drive.

16. The roof rack according to claim 1, characterized in that the guiding means of the second arm in the form of two projections are equipped with bearings for making the movement of the projections in the broken grooves of the first arm easier.

17. The roof rack according to claim 1, characterized in that cross-sections of the support, the first arm and the second arm are adapted for mutual insertion into each other in such a way that the support element, in its folded position, forms a compact longitudinal body of substantially elliptical cross-section.

18. The roof rack according to claim 1, characterized in that the support has a rectangular cross-section, and the guiding means of the support are in a form of two grooves, equipped with the stoppers at its ends, wherein the grooves are arranged one on each longitudinal side wall of the support at its outer side.

19. The roof rack according to claim 1, characterized in that the support has a cross-section of stylized letter "U", and the guiding means of the support are in the form of two grooves arranged one on each longitudinal side wall of the support at its inner side.

20. A movable transversal roof rack enabling loading and unloading a cargo away from a vehicle roof consisting of two support elements; one support element of the support elements to be placed on a front part of the vehicle roof, and another support element of the support elements to be placed on a rear part of the vehicle roof; characterized in that each support element of the support elements comprises a support, a first arm and a second arm, wherein:
  the support is in a form of a longitudinal profile with a rectangular cross-section and contains:
    means for attachment of holders for fixing the support element on the vehicle roof, and
    guiding means of the support in a form of two grooves, arranged along the support one on each longitudinal side wall of the support, wherein the grooves are equipped with stoppers at its ends;
  the first arm is arranged slidingly movable along the support, where the first arm consists of a first element and a second element mutually interconnected via a joint, wherein a sum of lengths of the first element and the second element represents a length of the first arm, and wherein the second element is adapted for deflection from its horizontal position around the joint downwards by an angle of 1° to 90° to a tilted position, and wherein the first arm further comprises:
    having a cross-section of inverted stylized letter "U",
    two first guiding means of the first arm adapted for cooperation with the guiding means of the support arranged one at each arm of the inverted letter "U" on its inner side, and
    two second guiding means of the first arm arranged one at each arm of the inverted letter "U" on its outer side, wherein each of the second guiding means is in a form of two grooves arranged substantially parallelly along the first element and the second element, and wherein in the tilted position of the second element, the second guiding means of the first arm are in a form of two broken grooves, and wherein the second guiding means of the first arm are equipped with:
    stoppers of the first arm for preventing complete sliding of the second arm from the first arm;
the second arm having a cross-section of the inverted stylized letter "U" is arranged slidingly movable along the first arm, wherein the second arm comprises:
load securing means;
two guiding means of the second arm arranged one at each arm of the inverted stylized letter "U" on its inner side, wherein each guiding means of the second arm is in a form of two projections adapted for movement in the broken grooves of the first arm and for stabilization of the second arm in its horizontal position;
an anchoring element arranged on its upper wall from the inner side, and the first arm comprises a complementary longitudinal groove arranged on its upper wall from the outer side; and
one stabilization element arranged on a proximal end of the second arm, the stabilization element comprising a region R adapted to abut on the first arm for ensuring stability of the second arm in the horizontal position during a transition of the guiding means of the second arm along breaks of the grooves.

* * * * *